United States Patent
Notarianni et al.

(10) Patent No.: US 11,773,733 B2
(45) Date of Patent: Oct. 3, 2023

(54) FIBROUS TEXTURE FOR TURBINE ENGINE BLADE MADE OF COMPOSITE MATERIAL

(71) Applicant: SAFRAN AIRCRAFT ENGINES, Paris (FR)

(72) Inventors: Gilles Pierre-Marie Notarianni, Moissy-Cramayel (FR); Teddy Fixy, Moissy-Cramayel (FR); Paula Salas De Los Rios, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/914,641

(22) PCT Filed: Mar. 18, 2021

(86) PCT No.: PCT/FR2021/050451
§ 371 (c)(1),
(2) Date: Sep. 26, 2022

(87) PCT Pub. No.: WO2021/191531
PCT Pub. Date: Sep. 30, 2021

(65) Prior Publication Data
US 2023/0119475 A1    Apr. 20, 2023

(30) Foreign Application Priority Data
Mar. 27, 2020    (FR) ........................ 2003065

(51) Int. Cl.
*F01D 5/28* (2006.01)
*B29C 70/24* (2006.01)

(52) U.S. Cl.
CPC .............. *F01D 5/282* (2013.01); *B29C 70/24* (2013.01); *F05D 2220/36* (2013.01); *F05D 2300/603* (2013.01)

(58) Field of Classification Search
CPC ..... F01D 5/282; B29C 70/24; B29D 99/0025; B29D 99/0028; F04D 29/324
See application file for complete search history.

(56) References Cited

U.S. PATENT DOCUMENTS

| | | | |
|---|---|---|---|
| 8,647,070 B2 * | 2/2014 | Jevons | F04D 29/324 416/224 |
| 10,590,945 B2 * | 3/2020 | Paquin | B29C 70/08 |

(Continued)

FOREIGN PATENT DOCUMENTS

| | | |
|---|---|---|
| EP | 2 253 806 A2 | 11/2010 |
| EP | 3 292 991 A1 | 3/2018 |

(Continued)

OTHER PUBLICATIONS

International Search Report as issued in International Patent Application No. PCT/FR2021/050451, dated Jun. 11, 2021.

*Primary Examiner* — Eldon T Brockman
(74) *Attorney, Agent, or Firm* — Pillsbury Winthrop Shaw Pittman LLP

(57) ABSTRACT

A fibrous texture forming the fibrous reinforcement of a turbomachine blade made of composite material which has a three-dimensional weaving between warp yarns or strands made of first fibers and weft yarns or strands made of first fibers, the texture including a blade root portion, a blade airfoil portion and a free end, the texture extending along the transverse direction between a first edge corresponding to a leading edge of the blade and a second edge corresponding to a trailing edge of the blade. The blade airfoil portion has a reinforced area extending along the longitudinal direction from the free end over a first length, and along the transverse direction from the second edge over a second length less, the reinforced area including weft yarns or strands made of (Continued)

second fibers different from the first fibers, the second fibers having an elongation at break greater than the first fibers.

12 Claims, 3 Drawing Sheets

(56) References Cited

U.S. PATENT DOCUMENTS

2010/0296942 A1* 11/2010 Jevons .................... F01D 5/282
 416/229 R
2018/0045207 A1* 2/2018 Paquin .................... B29C 70/08

FOREIGN PATENT DOCUMENTS

| FR | 3 040 909 A1 | 3/2017 | | |
|---|---|---|---|---|
| FR | 3040909 A1 * | 3/2017 | ............. | B29B 11/16 |
| WO | WO 2006/136755 A2 | 12/2006 | | |

* cited by examiner

[Fig. 1]
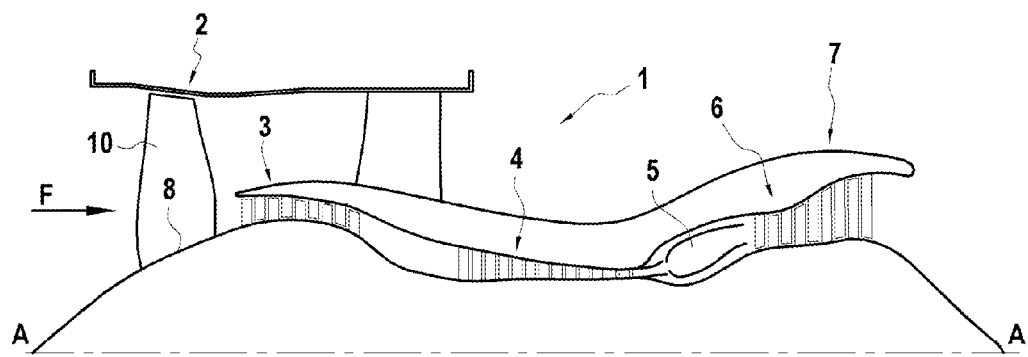
[Fig. 2]
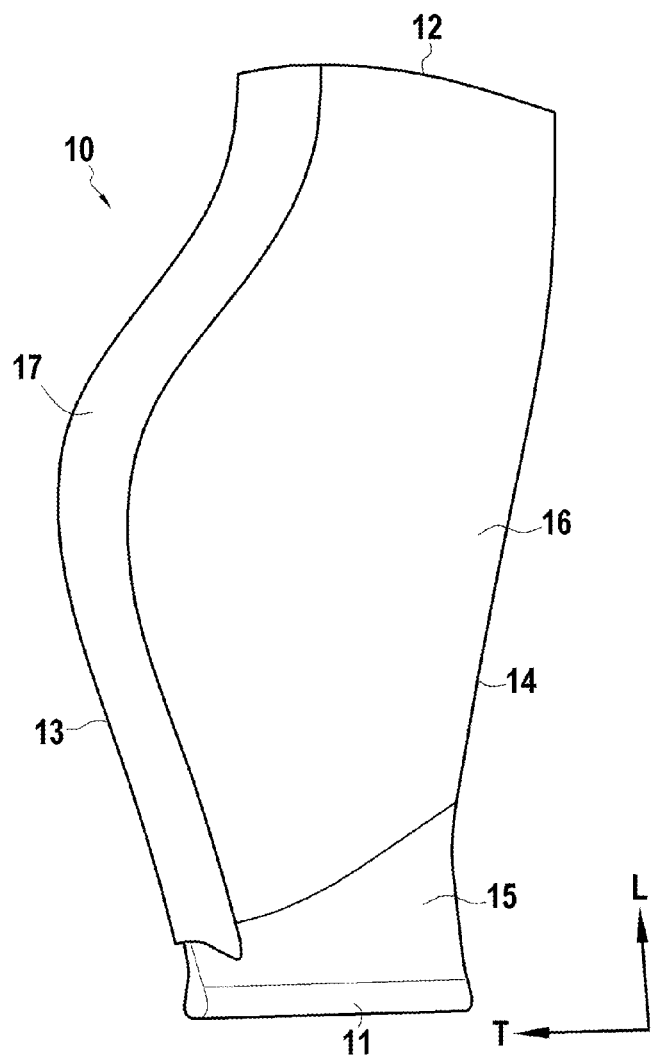

[Fig. 3]
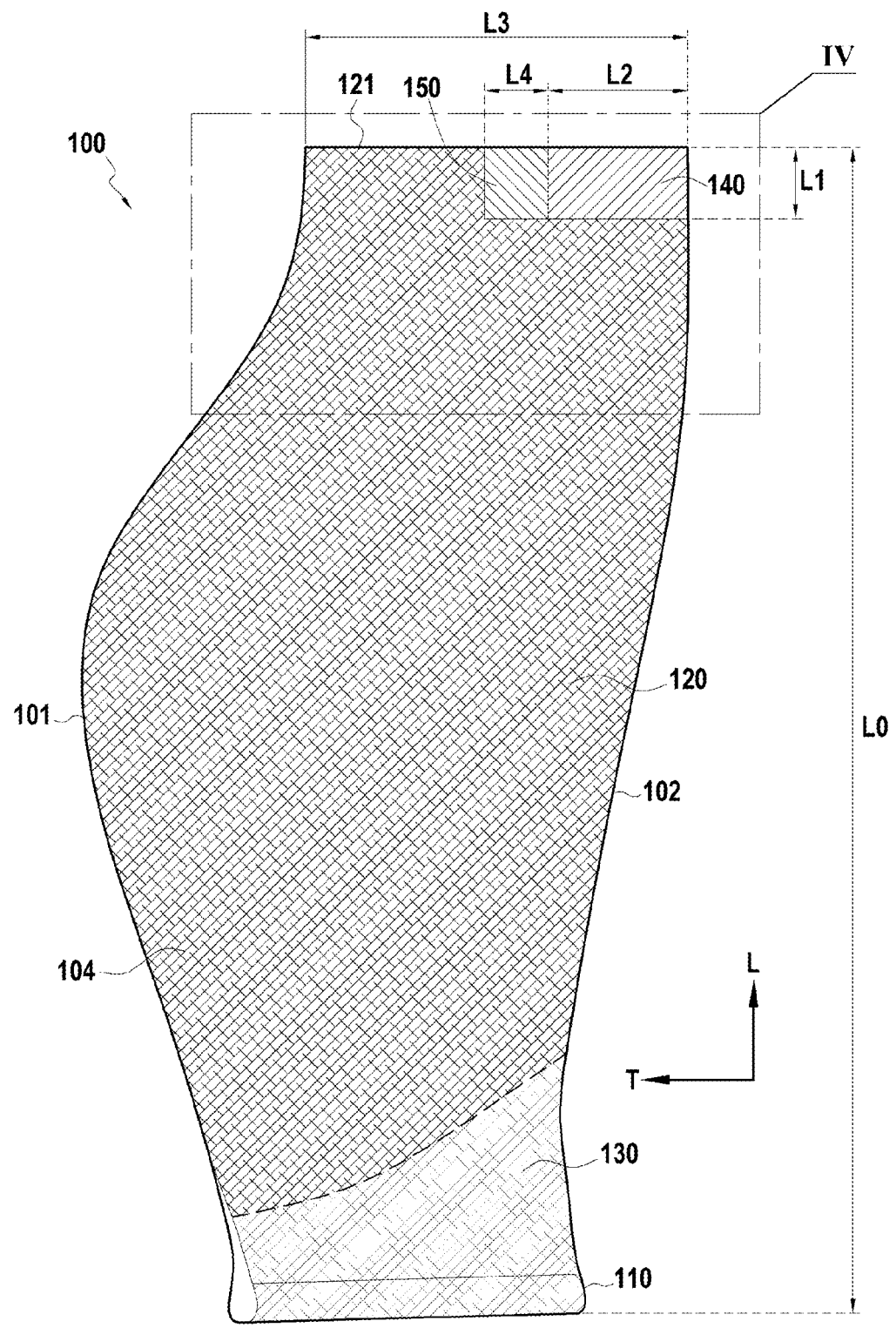

[Fig. 4]
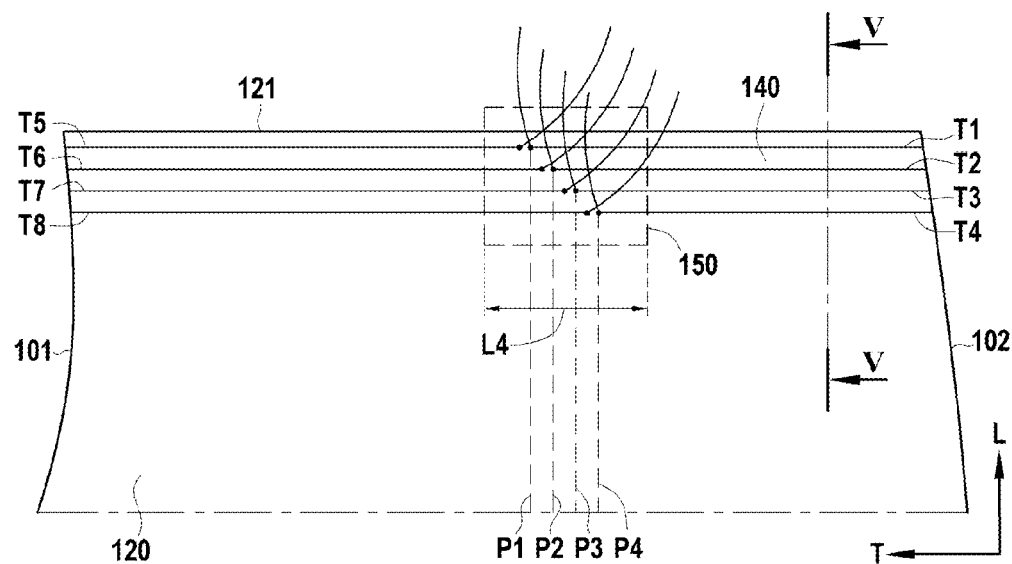
[Fig. 5]
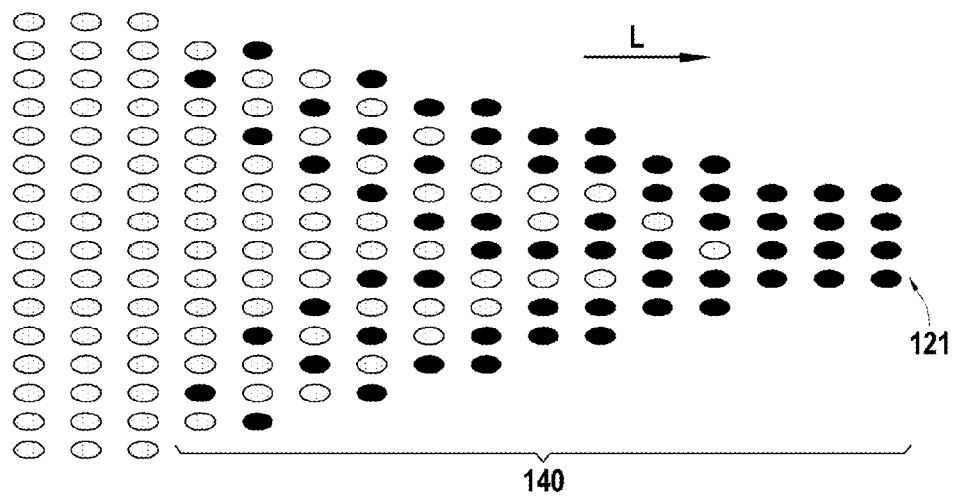

ically-matrix composite material poses certain problems, particularly in terms of resistance to impacts. Indeed, the location of these blades, for example in the fan or the compressor, can expose them to impacts of objects of various kinds (birds, gravel, blocks of ice, sand, etc.) and the OMC blades can then be damaged or erode.
FIBROUS TEXTURE FOR TURBINE ENGINE BLADE MADE OF COMPOSITE MATERIAL

CROSS-REFERENCE TO RELATED APPLICATIONS

This application is the U.S. National Stage of PCT/FR2021/050451, filed Mar. 18, 2021, which in turn claim priority to French patent application number 2003065 filed Mar. 27, 2020. The content of these applications are incorporated herein by reference in their entireties.

TECHNICAL FIELD

The invention relates to the general field of composite material parts for aeronautics. More specifically, the invention relates to a fibrous texture intended to form the fibrous reinforcement of a turbomachine blade made of composite material.

PRIOR ART

In the field of aeronautical turbomachines, the reduction in the mass of the parts is a major problem both in terms of the manufacturing costs of these parts, and in terms of the energy and environmental efficiency of the turbomachines. This problem quickly led to the development of parts made of composite materials, in particular organic-matrix composite (OMC) materials to replace the conventional metal parts in different portions of the turbojet engine.

However, the production of blades made of organic-matrix composite material poses certain problems, particularly in terms of resistance to impacts. Indeed, the location of these blades, for example in the fan or the compressor, can expose them to impacts of objects of various kinds (birds, gravel, blocks of ice, sand, etc.) and the OMC blades can then be damaged or erode.

The positioning of a metal foil on the leading edge of the blades to protect the latter from impacts while maintaining a reduced mass, is known. However, the body of the composite material blades of the fan may have areas of low thickness to address aerodynamic stresses which are still liable to be damaged in case of impact.

There is therefore a need for a turbomachine blade of reduced mass which is more resistant to impacts.

DISCLOSURE OF THE INVENTION

To this end, the invention proposes a fibrous texture intended to form the fibrous reinforcement of a turbomachine blade made of composite material comprising a fibrous reinforcement densified by a matrix, the texture being in one piece and having a three-dimensional weaving between a plurality of warp yarns or strands made of first fibers extending along a longitudinal direction and a plurality of weft yarns or strands made of first fibers extending along a transverse direction, the texture comprising a blade root portion and a blade airfoil portion extending between the blade root portion and a free end of the fibrous texture, the texture extending along the transverse direction between a first edge corresponding to a leading edge of the blade and a second edge corresponding to a trailing edge of the blade. The fibrous texture is characterized in that the blade airfoil portion has a reinforced area extending along the longitudinal direction from the free end of the fibrous texture over a first length less than or equal to 20%, preferably less than or equal to 10%, of the length of the fibrous texture measured in the longitudinal direction, and along the transverse direction from the second edge over a second length less than or equal to 75% of the width of the fibrous texture measured in the transverse direction at the level of the free end of the texture, the reinforced area comprising weft yarns or strands made of second fibers different from the first fibers, the second fibers having an elongation at break greater than that of the first fibers, and in that a first volume rate of second fibers in the reinforced area is greater than a second volume rate of second fibers in the rest of the blade airfoil portion of the fibrous texture.

In other words, there are more second fibers in the reinforced area than in the rest of the blade airfoil portion. Particularly, the second fibers can be present mainly in the weft yarns of the reinforced area.

It is meant by "volume rate of second fibers in a texture portion" the ratio between the volume occupied by said fibers and the total volume occupied by all the fibers in this portion. The yarns or strands can be only made up of fibers of the same material. It should be understood by "three-dimensional weaving" or "3D weaving", a weaving mode by which at least some of the warp yarns interlink weft yarns over several weft layers. A reversal of the roles between warp and weft is possible in the present text and must be considered as covered by the claims as well.

With such a fibrous texture, it is possible to produce a blade capable of better resisting the impacts of objects, in particular like a small or medium-sized bird for which localized damage is observed at the level of the trailing edge at the airfoil tip and in the transverse direction. The greater elongation at break of the second fibers located in the reinforced area allows the blade which will comprise such a texture as a reinforcement to withstand these impacts without significantly increasing its mass (the mass of the second fibers is generally greater than that of the first fibers). The use of the second fibers for weft yarns or strands makes the manufacture of such a fibrous texture easy since it suffices to replace the weft yarns or strands made of first fibers with those made of second fibers during weaving in a loom, as will be detailed later.

In one exemplary embodiment, the blade airfoil portion may further comprise a transition area adjacent along the transverse direction to the reinforced area and in which the weft yarns or strands made of second fibers are replaced by weft yarns or strands made of first fibers, the weft yarns or strands made of second fibers gradually exiting from the fibrous texture in the transition area at offset positions along the transverse direction, said weft yarns or strands made of second fibers being gradually replaced by weft yarns or strands made of first fibers at the level of the offset exit positions of the weft yarns or strands made of second fibers.

This disposition allows the damage to the blade comprising this texture as a reinforcement to be gradually distributed along the transverse direction and not to be concentrated on the same longitudinal plane (warp plane), which allows still improving the resistance of the blade in case of impacts.

In one exemplary embodiment, the transition area can extend transversely over a length comprised between 10 mm and 100 mm.

In one exemplary embodiment, the volume rate of second fibers in the reinforced area can decrease as moving away from the free end of the fibrous texture along the longitudinal direction. This disposition allows a gradual stiffness transition along the longitudinal direction which allows further improving the resistance to impact.

In one exemplary embodiment, the first length can be less than or equal to 100 mm.

In one exemplary embodiment, the second length can be less than or equal to 50% of the width of the fibrous texture measured in the transverse direction at the level of the free end of the texture.

In one exemplary embodiment, the first fibers can be made of carbon, and the second fibers can be made of a material chosen among the following: glass, basalt, aramid or polyester.

In one exemplary embodiment, the first volume rate can be of at least 30%, preferably comprised between 30% and 90%.

The invention also relates to a fan blade made of composite material comprising a fibrous reinforcement densified by a matrix, the fibrous reinforcement of the blade comprising a fibrous texture such as the one described above.

The invention also relates to an aeronautical turbomachine comprising a fan including a rotary disk and a plurality of blades such as the one presented above mounted on the rotary disk.

Finally, the invention relates to a method for manufacturing a fibrous texture intended to form the fibrous reinforcement of a turbomachine blade made of composite material comprising a fibrous reinforcement densified by a matrix, the texture being in one piece and being obtained by a three-dimensional weaving between a plurality of warp yarns or strands made of first fibers extending along a longitudinal direction and a plurality of weft yarns or strands made of first fibers extending along a transverse direction, the texture comprising a blade root portion and a blade airfoil portion extending between the blade root portion and a free end of the fibrous texture, the texture extending along the transverse direction between a first edge corresponding to a leading edge of the blade and a second edge corresponding to a trailing edge of the blade. The method is characterized in that the blade airfoil portion has a reinforced area extending along the longitudinal direction from the free end of the fibrous texture over a first length less than or equal to 20%, preferably less than or equal to 10%, of the length of the fibrous texture measured in the longitudinal direction, and along the transverse direction from the second edge over a second length less than or equal to 75% of the width of the fibrous texture measured in the transverse direction at the level of the free end of the texture, the reinforced area comprising weft yarns or strands made of second fibers different from the first fibers, the second fibers having an elongation at break greater than that of the first fibers, and in that a first volume rate of second fibers in the reinforced area is greater than a second volume rate of second fibers in the rest of the blade airfoil portion.

In one exemplary embodiment, the blade airfoil portion can further comprise a transition area adjacent along the transverse direction to the reinforced area in which the weft yarns or strands made of second fibers are replaced by weft yarns or strands made of first fibers, the method comprising the gradual exit of the weft yarns or strands made of second fibers in the transition area at offset positions along the transverse direction and the insertion of weft yarns or strands made of first fibers as a replacement for the weft yarns or strands made of second fibers at the level of the offset exit positions of the weft yarns or strands made of second fibers.

A method for manufacturing a fan blade made of composite material comprising a fibrous reinforcement densified by a matrix may comprise the following steps: a fibrous texture such as the one presented above is produced, said texture is shaped to obtain a blade preform, and a matrix is formed in the porosity of the preform to obtain the blade.

The fibrous texture is obtained by three-dimensional weaving, and may for example have an interlock-type weave. The matrix can be an organic matrix and be obtained from a resin. The matrix can thus be formed by resin injection molding (RTM or Resin Transfer Molding process).

BRIEF DESCRIPTION OF THE DRAWINGS

FIG. 1 is a schematic longitudinal sectional view of an aeronautical turbomachine.

FIG. 2 shows an aeronautical turbomachine fan blade according to one embodiment of the invention.

FIG. 3 shows a fibrous texture according to one embodiment of the invention.

FIG. 4 shows an enlarged schematic view of the fibrous texture of FIG. 3 at the level of its free end, where the path of some weft yarns can be seen.

FIG. 5 shows a longitudinal sectional view in the reinforced area of the fibrous texture at the level of its free end.

DESCRIPTION OF THE EMBODIMENTS

FIG. 1 shows a schematic longitudinal sectional view of an aeronautical turbomachine 1, here a turbofan engine centered on the axis A-A. It includes, from upstream to downstream in the direction F of flow of the gas stream in the turbomachine: a fan 2, a low-pressure compressor 3, a high-pressure compressor 4, a combustion chamber 5, a high-pressure turbine 6 and a low-pressure turbine 7.

The fan 2 comprises in particular a rotary disk 8 on which a plurality of fan blades 10 are mounted, one of which is represented in FIG. 2.

The fan blade 10 extends along a longitudinal direction L between a root 11 and a free end 12 and along a transverse direction T between a leading edge 13 and a trailing edge 14. Between the root 11 and the end 12, the blade includes a stilt 15 and an airfoil body 16 located between the stilt 15 and the end 12. The fan blade 10 is made of composite material comprising a fibrous reinforcement densified by a matrix.

In the example illustrated, the blade 10 has a metal leading edge 17, for example in the form of a metal foil. Such a metal leading edge 17 can be fixed after having obtained the blade 10, or be integrated into the blade 10 during its manufacturing method, in a known manner.

FIG. 3 shows a schematic view of a fibrous texture 100 intended to form the fibrous reinforcement of a turbomachine blade such as that of FIG. 2. This fibrous texture 100 can be obtained for example by three-dimensional weaving in a Jacquard-type loom of a fibrous blank and cutting of the excess yarns from the woven fibrous blank.

The fibrous texture 100 can have a three-dimensional weaving, and for example mainly comprise an interlock or multilayer weave. It is meant by "interlock weave" a three-dimensional weave in which each layer of warp yarns interlinks a plurality of layers of weft yarns, with all of the yarns in the same warp column having the same movement in the weave plane. Document WO2006/136755 describes the production of such weaves. As will be described later, this fibrous texture can be shaped and then densified to obtain a fan blade 10 such as that illustrated in FIG. 2.

The fibrous texture 100 extends along the longitudinal direction L between a blade root portion 110 and a blade airfoil portion 120. The texture 100 has a free end 121 located at the end of the blade airfoil portion 120 opposite to the blade root portion 110. A blade stilt portion 130 is present between the blade root portion 110 and the blade airfoil portion 120. Generally, the blade root portion 110 is thicker than the blade stilt portion 130, and the thickness of the blade airfoil portion 120 is variable. The fibrous texture 100 extends along the transverse direction T between a first edge 101 intended to form the leading edge 13 of the blade 10 and a second edge 102 intended to form the trailing edge 14 of the blade 10.

In the example illustrated, the longitudinal direction L also corresponds to the general direction along which the warp yarns extend in the fiber texture 100, while the transverse direction T corresponds to the general direction along which the weft yarns extend. It will be noted that throughout the text, warp and weft can be interchanged.

The fibrous texture 100 has a three-dimensional or multi-layer weaving between a plurality of warp yarns made of first fibers and a plurality of weft yarns made of first fibers. In accordance with the invention, the fibrous texture 100 also has weft yarns made of second fibers, different from the first fibers, and which have an elongation at break greater than that of the first fibers. More specifically, the fibrous texture 100 has a reinforced area 140 which comprises weft yarns made of second fibers. The reinforced area 140 extends from the free end 121 of the fibrous texture along the longitudinal direction L over a first length L1 less than or equal to 20%, preferably less than or equal to 10%, of the length L0 of the fibrous texture 100 measured in the longitudinal direction L, and along the transverse direction T from the second edge 102 over a second length L2 less than or equal to 75% of the width L3 of the fibrous texture measured in the transverse direction T at the level of the free end 121 of the fibrous texture 100. For example, the length L1 can be less than or equal to 100 mm. For example, the length L2 can be less than or equal to 50% of the width L3.

A first volume rate of second fibers in the reinforced area 140 is greater than a second volume rate of second fibers in the rest of the blade airfoil portion 120. In other words, the second fibers are mainly present in the reinforced area 140 of the blade airfoil portion 120. The second fibers are mostly located in the weft yarns of said area 140. The first volume rate can be of at least 30%, preferably comprised between 30% and 90%.

The material of the first fibers can be carbon. The material of the second fibers can be chosen among the following: glass, basalt, aramid, polyester, or a combination of these materials. The following table gives common elongations at break of several fibers that can be used.

TABLE 1

| material of the fibers - reference | elongation at break (%) |
|---|---|
| glass - AGY "S-2 Glass ®" | 5.2 |
| glass - "E-Glass" | 4.4 |
| polyester | 3.5 |
| basalt | 3 |
| aramid - Dupont "kevlar ® 49" | 2.4 |
| carbon - Toray "HS T700" | 2.1 |
| carbon - Toray "HS TR30S" | 1.9 |
| carbon - Toray "HS T300" | 1.5 |

For example, carbon can be chosen for the first fibers and glass can be chosen for the second fibers. It is also possible to use several types of weft yarns or strands which comprise different fibers having an elongation at break greater than that of the first fibers. It will be noted that the material of the first and second fibers can be identical. For example, the first and second fibers can be made of carbon, provided that their elongations at break are different. For example, it is possible to choose first carbon fibers made of HexTow® IM7 (marketed by the company Hexcel), and second carbon fibers made of Torayca® T1100 (marketed by the company Toray).

The elongation at break of the first fibers can be for example less than or equal to 2.1%, and that of the second fibers greater than or equal to 2.4%.

The fibrous texture 100 further comprises a transition area 150 which is adjacent to the reinforced area 140 along the transverse direction T, in which the weft yarns made of second fibers are replaced by weft yarns made of first fibers. This transition area 150 will be described in more detail using FIG. 4.

FIG. 4 schematically represents the path of four weft yarns T1, T2, T3 and T4 made of second fibers which are woven in the reinforced area 140. The weft yarns T1 to T4 are here inserted into the fibrous texture 100 by the second edge 102 then woven with warp yarns (not represented) in the reinforced area 140, and finally exited from the fibrous texture 100 in the transition area 150. In this example, the weft yarns T1 to T4 made of second fibers are gradually exited from the fibrous texture 100 at offset positions along the transverse direction T. In other words, the weft yarns T1 to T4 are exited from the fibrous texture 100 at the level of different transverse planes or warp planes P1, P2, P3 and P4. More specifically, in this example, the weft yarn T1 closest to the free end 121 of the fiber texture 100 is exited at the level of a warp plane P1 located closer to the first edge 101 than the warp plane P2 at the level of which the weft yarn T2 which is farther from the free end 121 than the weft yarn T1 is exited. The same applies to the yarns T3 and T4 which are exited at the level of the warp planes P3 and P4 offset in the transverse direction T.

The weft yarns T1 to T4 are then replaced by weft yarns T5, T6, T7 and T8 made of first fibers in the transition area 150, at the level of or in the immediate vicinity of the offset exit positions of the yarns T1, T2, T3 and T4 respectively. The weft yarns T5, T6, T7 and T8 are thus inserted into the fibrous texture 100 in the transition area 150 then woven normally on the remaining portion of the fibrous texture 100. This disposition allows distributing the positions where a change in stiffness intervenes between the first fibers and the second fibers on several warp planes in order to further increase the resistance in case of impact. For example, the transition area 150 extends over a length L4 comprised between 10 mm and 100 mm.

FIG. 5 shows a longitudinal sectional view of the fibrous texture 100 in the reinforced area 140 illustrating the characteristic according to which the volume rate of second fibers in the reinforced area 140 decreases as moving away from the free end 121 of the fibrous texture along the longitudinal direction L. FIG. 5 shows only the weft yarns in section. The weft yarns made of first fibers are represented in light color and the weft yarns made of second fibers are represented in black color. It can be seen that the proportion of weft yarns made of second fibers in each column of weft yarns decreases as moving away from the free end 121. This disposition allows ensuring a gradual stiffness transition between the reinforced area 140 and the rest of the airfoil portion 120 of the fibrous texture 100 in the longitudinal direction L, in order to further increase the resistance in case of impact. The example shown in FIG. 5 shows a longitudinal section of a reinforced area with a degressive thickness corresponding to a reduction in the number of yarns in the longitudinal direction. According to one variant of embodiment, the number of yarns present in the reinforced area is constant in the longitudinal direction.

To obtain a fan blade 10 such as the one illustrated in FIG. 2, a fibrous texture 100 is produced by three-dimensional weaving, said texture is shaped to obtain a blade preform having the appropriate geometry, and a matrix is formed in the porosity of the preform to obtain the blade. It is possible, during weaving, to replace weft yarns made of first fibers with weft yarns made of second fibers in the reinforced area 140 of the fiber texture as described above.

The fan blade 10 can be produced by a resin transfer molding (RTM) process where the preform is placed in a mold having the shape of the blade and in which a resin is injected and then polymerized. In this case, the matrix can be an organic matrix and obtained from an epoxy-type resin.

The invention claimed is:

1. A fibrous texture intended to form the fibrous reinforcement of a turbomachine blade made of composite material comprising a fibrous reinforcement densified by a matrix, the fibrous texture being in one piece and having a three-dimensional weaving between a plurality of warp yarns or strands made of first fibers extending along a longitudinal direction and a plurality of weft yarns or strands made of first fibers extending along a transverse direction, the texture comprising a blade root portion and a blade airfoil portion extending between the blade root portion and a free end of the fibrous texture, the fibrous texture extending along the transverse direction between a first edge corresponding to a leading edge of the blade and a second edge corresponding to a trailing edge of the blade,
- wherein the blade airfoil portion has a reinforced area extending along the longitudinal direction from the free end of the fibrous texture over a first length less than or equal to 20% of a length of the fibrous texture measured in the longitudinal direction, and along the transverse direction from the second edge over a second length less than or equal to 75% of a width of the fibrous texture measured in the transverse direction at the level of the free end of the fibrous texture, the reinforced area comprising weft yarns or strands made of second fibers different from the first fibers, the second fibers having an elongation at break greater than that of the first fibers, and a first volume rate of second fibers in the reinforced area is greater than a second volume rate of second fibers in the rest of the blade airfoil portion of the fibrous texture.

2. The fibrous texture according to claim 1, wherein the blade airfoil portion further comprises a transition area adjacent along the transverse direction to the reinforced area and wherein the weft yarns or strands made of second fibers are replaced by weft yarns or strands made of first fibers, the weft yarns or strands made of second fibers gradually exiting from the fibrous texture in the transition area at offset positions along the transverse direction, said weft yarns or strands made of second fibers being gradually replaced by weft yarns or strands made of first fibers at the level of the offset exit positions of the weft yarns or strands made of second fibers.

3. The fibrous texture according to claim 2, wherein the transition area extends transversely over a length comprised between 10 mm and 100 mm.

4. The fibrous texture according to claim 1, wherein the second volume rate of second fibers in the reinforced area decreases as moving away from the free end of the fibrous texture along the longitudinal direction.

5. The fibrous texture according to claim 1, wherein the first length is less than or equal to 100 mm.

6. The fibrous texture according to claim 1, wherein the second length is less than or equal to 50% of the width of the fibrous texture measured along the transverse direction at the level of the free end of the texture.

7. The fibrous texture according to claim 1, wherein the first fibers are made of carbon, and the second fibers are made of a material chosen among the following: glass, basalt, aramid or polyester.

8. The fibrous texture according to claim 1, wherein the first volume rate is of at least 30%.

9. A fan blade made of composite material comprising a fibrous reinforcement densified by a matrix, the fibrous reinforcement of the blade comprising a fibrous texture according to claim 1.

10. An aeronautical turbomachine comprising a fan including a rotary disk and a plurality of blades according to claim 9 mounted on the rotary disk.

11. A method for manufacturing a fibrous texture intended to form the fibrous reinforcement of a turbomachine blade made of composite material comprising a fibrous reinforcement densified by a matrix, the fibrous texture being in one piece and being obtained by three-dimensional weaving between a plurality of warp yarns or strands made of first fibers extending along a longitudinal direction and a plurality of weft yarns or strands made of first fibers extending along a transverse direction, the fibrous texture comprising a blade root portion and a blade airfoil portion extending between the blade root portion and a free end of the fibrous texture, the fibrous texture extending along the transverse direction between a first edge corresponding to a leading edge of the blade and a second edge corresponding to a trailing edge of the blade,
- a. wherein the blade airfoil portion has a reinforced area extending along the longitudinal direction from the free end of the fibrous texture over a first length less than or equal to 20% of a length of the fibrous texture measured in the longitudinal direction, and along the transverse direction from the second edge over a second length less than or equal at 75% of a width of the fibrous texture measured in the transverse direction at the level of the free end of the fibrous texture, the reinforced area comprising weft yarns or strands made of second fibers different from the first fibers, the second fibers having an elongation at break greater than that of the first fibers, and a first volume rate of second fibers in the reinforced area is greater than a second volume rate of second fibers in the rest of the blade airfoil portion of the fibrous texture.

12. The method according to claim 11, wherein the blade airfoil portion further comprises a transition area adjacent along the transverse direction to the reinforced area in which the weft yarns or strands made of second fibers are replaced by weft yarns or strands made of first fibers, the method comprising the gradual exit of the weft yarns or strands made of second fibers in the transition area at offset positions along the transverse direction and the insertion of weft yarns or strands made of first fibers as a replacement for the weft yarns or strands made of second fibers at the level of the offset exit positions of the weft yarns or strands made of second fibers.

* * * * *